United States Patent
Mitchell

(10) Patent No.: US 11,623,408 B2
(45) Date of Patent: Apr. 11, 2023

(54) USING PYROMETRY TO IDENTIFY POROSITY IN ADDITIVELY MANUFACTURED STRUCTURES

(71) Applicant: National Technology & Engineering Solutions of Sandia, LLC, Albuquerque, NM (US)

(72) Inventor: John A. Mitchell, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 493 days.

(21) Appl. No.: 16/817,340

(22) Filed: Mar. 12, 2020

(65) Prior Publication Data

US 2021/0187860 A1   Jun. 24, 2021

Related U.S. Application Data

(60) Provisional application No. 62/949,886, filed on Dec. 18, 2019.

(51) Int. Cl.
| | |
|---|---|
| *B29C 64/393* | (2017.01) |
| *G01N 15/08* | (2006.01) |
| *G01J 5/08* | (2022.01) |
| *B33Y 50/02* | (2015.01) |

(52) U.S. Cl.
CPC ......... *B29C 64/393* (2017.08); *G01N 15/088* (2013.01); *B33Y 50/02* (2014.12);
(Continued)

(58) Field of Classification Search
CPC ........ B22F 10/38; B22F 10/85; B22F 10/368; B22F 10/28; B22F 12/90; B22F 2999/00;
(Continued)

(56) References Cited

U.S. PATENT DOCUMENTS

| | | | |
|---|---|---|---|
| 2015/0209910 A1* | 7/2015 | Denney | B23K 26/32 |
| | | | 219/76.1 |
| 2016/0185048 A1* | 6/2016 | Dave | B22F 10/20 |
| | | | 700/119 |

(Continued)

OTHER PUBLICATIONS

Mohr, G. et al., "In-Situ Defect Detection in Laser Powder Bed Fusion by Using Thermography and Optical Tomography-Comparison to Computed Tomography", Metals, 2020, vol. 10, No. 103, Jan. 9, 2020, doi 10.3390/rnet10010103, pp. 1-19.

(Continued)

*Primary Examiner* — Sang H Nguyen
(74) *Attorney, Agent, or Firm* — Gregory M. Doudnikoff; Yee & Associates P.C.

(57) ABSTRACT

A method and apparatus for identifying porosity in a structure made by an additive manufacturing process in which a laser is scanned across layers of material to form the structure. Pyrometry data comprising images of the layers acquired during additive manufacturing of the structure is received. The pyrometry data is used to generate temperature data comprising estimated temperatures of points in the layers in the images of the layers. The temperature data is used to identify shapes fit to high temperature areas in the images of the layers. Conditions of the shapes fit to the high temperature areas in the images of the layers are identified. Outlier shapes are identified in the shapes fit to the high temperature areas in the images of the layers using the conditions of the shapes.

18 Claims, 6 Drawing Sheets

(52) U.S. Cl.
CPC ........ *G01J 5/08* (2013.01); *G01N 2015/0846* (2013.01); *G01N 2223/649* (2013.01)

(58) Field of Classification Search
CPC . B22F 2203/11; B29C 64/386; B29C 64/393; B29C 64/165; B29C 64/153; B33Y 10/00; B33Y 50/00; B33Y 50/02; G01N 15/088; G01N 2015/0846; G01N 2223/649; G01J 5/08; Y02P 10/25
See application file for complete search history.

(56) References Cited

U.S. PATENT DOCUMENTS

| | | | |
|---|---|---|---|
| 2017/0165792 A1* | 6/2017 | Buller | B29C 64/35 |
| 2017/0266762 A1* | 9/2017 | Dave | B22F 10/366 |
| 2018/0120260 A1* | 5/2018 | Goldfine | B33Y 50/02 |
| 2018/0154443 A1* | 6/2018 | Milshtein | B29C 64/393 |
| 2018/0250772 A1* | 9/2018 | Symeonidis | B23K 26/034 |
| 2019/0118300 A1* | 4/2019 | Penny | B23K 26/0821 |
| 2019/0134709 A1* | 5/2019 | Dave | B33Y 10/00 |
| 2020/0166909 A1* | 5/2020 | Noone | G06N 20/00 |

OTHER PUBLICATIONS

Khanzadeh, M. et al., "Porosity prediction: Supervised-learning of thermal history for direct laser deposition", Journal of Manufacturing Systems, vol. 47, 2018, pp. 69-82.
Stockman, T. et al., "Stainless Steel 304L LENS AM Process Monitoring Using In-Situ Pyrometer Data", JOM, vol. 70, No. 9, published online Jul. 25, 2018, pp. 1835-1843.

* cited by examiner

USING PYROMETRY TO IDENTIFY POROSITY IN ADDITIVELY MANUFACTURED STRUCTURES

This application claims the benefit of U.S. Provisional Patent Application No. 62/949,886, filed Dec. 18, 2019, which is incorporated by reference herein in its entirety.

GOVERNMENT LICENSE RIGHTS

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates generally to systems and methods for identifying voids or pores in structures that are made by additive manufacturing processes. More particularly, illustrative embodiments are directed to a system and method for identifying voids in a structure using pyrometry data that is obtained during the building of the structure by an additive manufacturing process such as laser powder bed fusion.

2. Background

Additive manufacturing is an increasingly utilized method for fabricating commercial and industrial products of arbitrary shapes from digital models. In additive manufacturing, a three-dimensional object is made by adding material layer by layer. Additive manufacturing may produce a three-dimensional object by using an energy source, such as a laser beam or an electron beam, to fuse layers of material together. Laser powder bed fusion is one example of such an additive manufacturing process in which metallic powders are melted by a laser and then solidify to create a three-dimensional object.

Voids or pores may unintentionally form in a structure during the making of the structure by an additive manufacturing process. Porosity in additively manufactured metals, for example, can reduce strength and is generally undesirable. It is desirable to identify voids in an additively manufactured structure in an effective and efficient manner. Micro-computed tomography, micro-CT, is extensively used in additive manufacturing applications and within the materials community to assist non-destructive evaluation for a variety of phenomena and material structures.

Pyrometry is the measurement of surface temperature by the characteristics of the radiation that is emitted from the surface. A pyrometer is a type of remote-sensing thermometer that is used to measure the temperature of a surface at a distance from the amount of thermal radiation emitted from the surface. A two-color pyrometer uses a ratio of energy measured at two different wavelengths to create a temperature reading. Effective and efficient systems and methods for using pyrometry to identify voids in additively manufactured structures are not currently available.

Therefore, it may be desirable to have a method and apparatus that take into account at least some of the issues discussed above, as well as other possible issues.

SUMMARY

Illustrative embodiments provide a method of identifying porosity in a structure made by an additive manufacturing process in which a laser is scanned across layers of material to form the structure. Pyrometry data comprising images of the layers acquired during additive manufacturing of the structure is received. The pyrometry data is used to generate temperature data comprising estimated temperatures of points in the layers in the images of the layers. The temperature data is used to identify shapes fit to high temperature areas in the images of the layers. Conditions of the shapes fit to the high temperature areas in the images of the layers are identified. Outlier shapes fit to the high temperature areas in the images of the layers are identified using the conditions of the shapes.

Illustrative embodiments also provide a method of identifying porosity in a structure made by an additive manufacturing process in which a laser is scanned across layers of material to form the structure. Pyrometry data comprising images of the layers acquired during additive manufacturing of the structure is received. The pyrometry data is used to generate temperature data comprising estimated temperatures of points in the layers in the images of the layers. The temperature data is used to identify ellipses fit to high temperature areas in the images of the layers. Outlier ellipses are identified in the ellipses fit to high temperature areas in the images of the layers using conditions of the ellipses. The identified outlier ellipses are used to identify voids in the structure.

Illustrative embodiments also provide a system for identifying porosity in a structure made by an additive manufacturing process in which a laser is scanned across layers of material to form the structure. The system comprises a receiver, a temperature estimator, a shape identifier, and an outlier identifier. The receiver is configured to receiving pyrometry data comprising images of the layers acquired during additive manufacturing of the structure. The temperature estimator is configured to use the pyrometry data to generate temperature data comprising estimated temperatures of points in the layers in the images of the layers. The shape identifier is configured to use the temperature data to identify shapes fit to high temperature areas in the images of the layers. The outlier identifier is configured to identify outlier shapes in the shapes fit to the high temperature areas using conditions of the shapes.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Illustrative embodiments recognize and take into account various considerations. For example, the illustrative embodiments recognize and take into account that the mechanical strength and performance of a structure can be greatly affected by voids or pores generated during manufacturing of the structure by an additive manufacturing process. Pores usually degrade material properties, especially strength, and too many pores can lead to significant reductions in strength and other engineering properties.

Although a qualitative understanding exists for pore formation in additive manufacturing processes, automated measures to qualify built parts or prevent pore formation which incorporate in-situ measurements do not yet exist. Machine parameters and powder properties have been identified and studied for purposes of controlling porosity in manufacturing by laser powder bed fusion, but these approaches still utilize an open loop, trial and error methodology. Furthermore, porosity is typically measured on the basis of a volume average using Archimedes method. Pore location information is the next desirable level of measurement resolution for porosity found in additively manufactured parts.

Illustrative embodiments use pyrometry data to predict the locations of voids in additively manufactured structures. The pyrometry data is acquired in-situ during manufacturing of the structure. For example, the pyrometry data may be collected during the building of a structure using selective melt powder bed additive manufacturing. In accordance with an illustrative embodiment, the pyrometry data is collected in the form of two-dimensional images of the surface of a structure as the structure is being manufactured by an additive manufacturing process.

In accordance with an illustrative embodiment, the pyrometry data is used to make estimates of the surface temperature of the structure being built. The surface temperature estimates are contoured. An ellipse is fit to the hottest region. The contours are used to approximate the shape of a heat effected zone. Data sets comprising a relatively large number of images are collected, processed, and analyzed to predict pore formation. Instantaneous anomalous build conditions, that lead to porosity in a final built part, are identified from outlier conditions identified in the pyrometry data images. Images are classified as outliers according to contour orientation and aspect ratio. Outlier images so identified have been shown to strongly correlate with voids in a structure that are identified using micro-computed tomography data of built parts.

Figure 1:
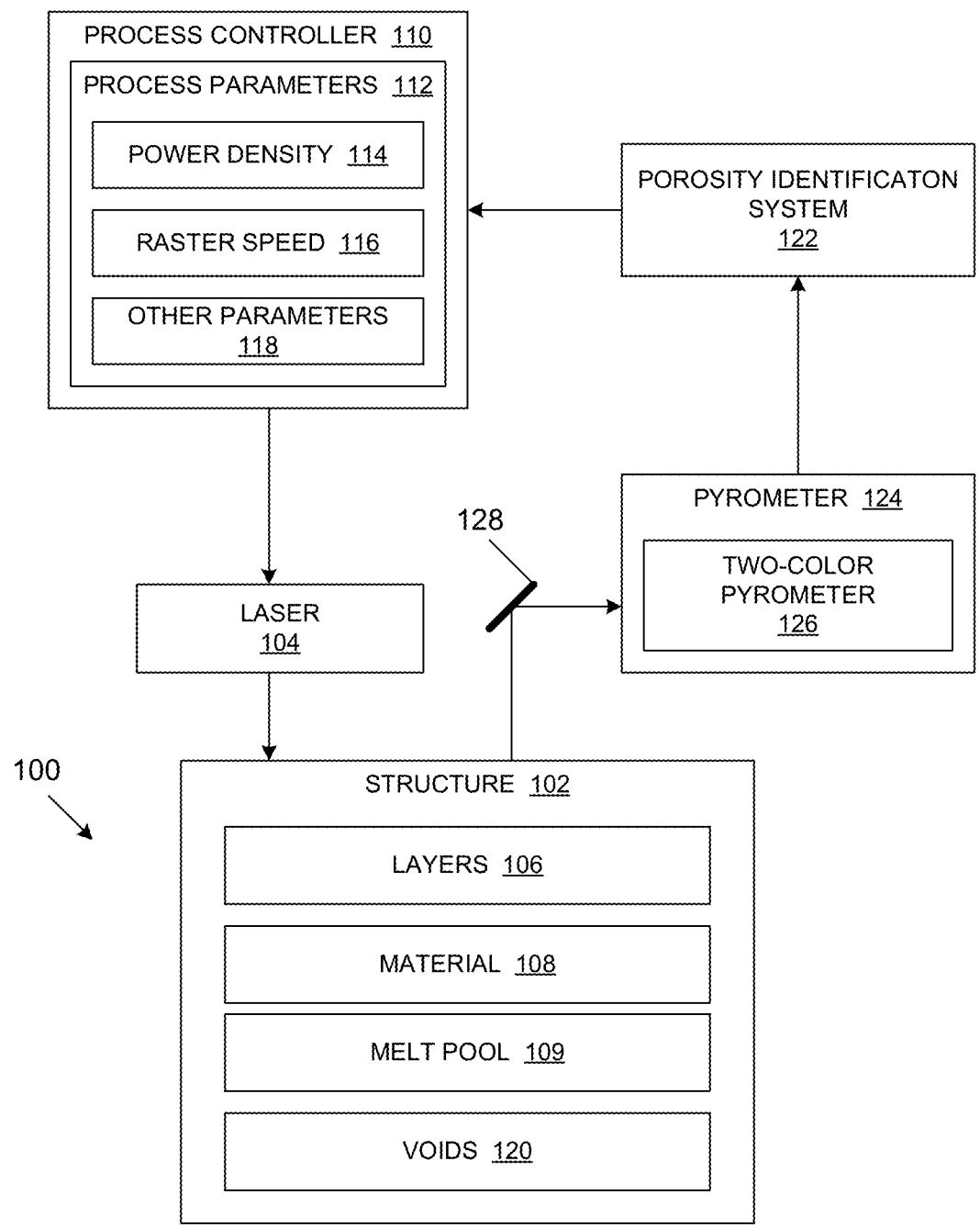
FIG. 1 is an illustration of a block diagram of an additive manufacturing system in accordance with an illustrative embodiment.

Turning to FIG. 1, an illustration of a block diagram of an additive manufacturing system is depicted in accordance with an illustrative embodiment. Additive manufacturing system 100 may comprise any appropriate system for making structure 102 by scanning laser 104 across layers 106 of material 108. Structure 102 may be any appropriate structure of any appropriate size or shape.

For example, without limitation, additive manufacturing system 100 may be configured for making structure 102 by laser powder bed fusion. In this example, material 108 comprises a metallic powder that is melted by laser 104 and then solidified to create structure 102. Laser 104 forms melt pool 109 of melted material 108 in the top one of layers 106 of material 108 as laser 104 is scanned across the layer.

Laser 104 and other components of additive manufacturing system 100 may be controlled by process controller 110 to make structure 102 by an additive manufacturing process. Process controller 110 may control various process parameters 112 in the making of structure 102. For example, without limitation, process parameters 112 may include power density 114 of laser 104, raster speed 116 of laser 104, other parameters 118, and various combinations of parameters.

Unintentional and undesirable voids 120 may be formed in structure 102 during the making of structure 102 by additive manufacturing system 100. Voids 120 also may be referred to as pores. Depending on the number, size, and position of voids 120, voids 120 may weaken structure 102 and voids 120 in structure 102 are generally undesirable.

Voids 120 in structure 102 may be identified by porosity identification system 122. In accordance with an illustrative embodiment, porosity identification system 122 identifies voids 120 in structure 102 using pyrometry data that is acquired by pyrometer 124 during additive manufacturing of structure 102 by additive manufacturing system 100. Steering mirror 128 may be used to direct light emitted from layers 106 to the input lens of pyrometer 124. Preferably, pyrometer 124 is positioned and adjusted as appropriate such that the focus of pyrometer 124 matches the focus of laser 104.

For example, without limitation, pyrometer 124 may be two-color pyrometer 126 that obtains pyrometry data in the form of images of layers 106 of structure 102 as structure 102 is being made. A plurality of images of each layer of structure 102 are obtained by pyrometer 122 as laser 104 is scanned across the layer.

Porosity identification system 122 may identify voids 120 in structure 102 for various purposes. For example, without limitation, porosity identification system 122 may be used to accept or reject structure 102 depending on the number, size, and location of voids 120 identified in structure 102. As another example, porosity identification system 122 may modify the control of additive manufacturing system 100 by process controller 110 in response to identifying voids 120 in structure 102 to reduce the formation of undesirable voids 120 in structure 102.

The illustration of additive manufacturing system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
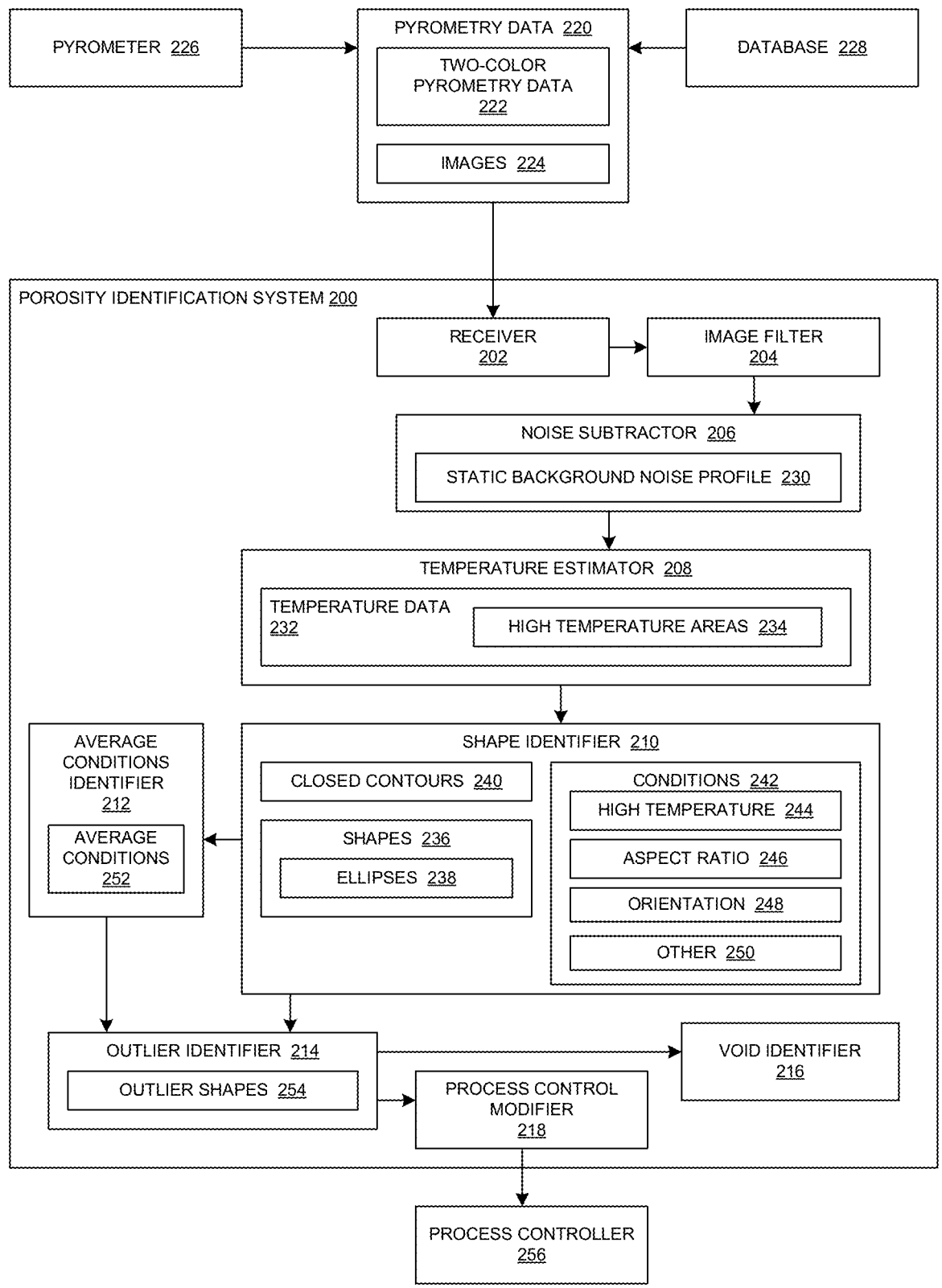
FIG. 2 is an illustration of a block diagram of a porosity identification system in accordance with an illustrative embodiment.

Turning to FIG. 2, an illustration of a block diagram of a porosity identification system is depicted in accordance with an illustrative embodiment. Porosity identification system 200 is an example of one implementation of porosity identification system 122 in FIG. 1. Porosity identification system 200 comprises receiver 202, image filter 204, noise subtractor 206, temperature estimator 208, shape identifier 210, average conditions identifier 212, outlier identifier 214, void identifier 216, and process control modifier 218.

Receiver 202 is configured to receive pyrometry data 220. For example, without limitation, pyrometry data 220 may comprise two-color pyrometry data 222 comprising images 224 of layers of a structure that are acquired during additive manufacturing of the structure.

Pyrometry data 220 may be collected by pyrometer 226 at any appropriate rate. For example, without limitation, pyrometry data 220 may be collected at rate of approximately 7 kHz, or at another appropriate rate, to provide two-dimensional images 224 with a resolution of approximately 20 microns per pixel, or another appropriate resolution.

Pyrometry data 220 may be received from pyrometer 226 as pyrometry data 220 is being acquired, for the identification of voids in a structure as the structure is being made. Alternatively, or in addition, pyrometry data 220 acquired during manufacturing of a structure may be stored in database 228 and received from database 228 at a later time for the identification of voids after manufacturing of the structure is complete.

Image filter 204 is configured to remove any of images 224 that are acquired when the laser used to form a structure by additive manufacturing is turned off. During an additive manufacturing build, pyrometry data 220 is collected in-situ. A typical dataset can contain tens of thousands of images as data is collected even when the laser is off. Uncertainties in hardware trigger delays and signal jitter prompt the use of very conservative data capture settings. A large image set is preferably collected per layer to ensure that the entire scan path of the laser for the desired structure is captured. Images acquired when the laser is absent produce images with very low signal to noise ratios and preferably are removed from the analysis.

Laser position and a threshold criteria may be used to filter and remove images containing no laser signal information. For example, without limitation, two-color pyrometry data 222 may consist of longer and shorter wavelength data. Each wavelength is separately processed and imaged. To identify and avoid processing of those of images 224 that are obtained when the laser is turned off, a minimum threshold may be set on the long wavelength data. If the peak value within the image is less than the threshold value, the entire image, including both long and short wavelength data, may be discarded. An alternative equivalent method could be used on short wavelength data. For estimating the temperature of points in a layer from images of the layer both short and long wavelength data is required, so that one cannot be used without the other.

Noise subtractor 206 is configured to subtract static background noise profile 230 from pyrometry data 220. Static background noise profile 230 is contained within every one of image 224 and can be observed in images that are obtained when the laser is off. Static background noise profile 230 confounds raw pyrometry data 220 when the laser is on, and is eliminated by subtracting static background noise profile 230 from pyrometry data 220 at each pixel.

Pyrometry data 220 may comprise image data that is positive. In this case, subtracting static background noise profile 230 may result in negative values at some pixels. This may be remedied by setting these pixel values to zero. This may reduce the overall computational speed but is nonetheless a desirable step to maintain a realistically bounded calculation.

Temperature estimator 208 is configured to use pyrometry data 220 to generate temperature data 232 that comprises estimated temperatures of points in the layers of a structure from images 224 of the layers. For example, without limitation, temperature data 232 may include an image of temperatures of a layer at a particular point in time that is derived from two corresponding images 224 of two-color pyrometry data 220 for that point in time.

From temperature data 232 high temperature areas 234 of the layers corresponding to the melt pool of material melted by the laser may be identified. High temperature areas 234 may be identified as areas on a layer having a temperature, as identified in temperature data 232, that is greater than a selected temperature. For example, without limitation, the selected temperature may be a selected percentage of the maximum temperature identified for the layer in a temperature image for the layer in temperature data 232.

Using two-color thermography, an estimation of absolute temperature is possible without detailed knowledge of emissivity. This method uses the grey-body assumption, that emissivity remains constant at different wavelengths. Experiments have shown this assumption to be accurate for various materials and pyrometer wavelengths.

Proper calibration of pyrometer 226 is needed to produce accurate absolute temperatures. Calibration of pyrometer 226 may be performed in any appropriate manner. For example, without limitation, calibration of pyrometer 226 may be performed using a tungsten lamp placed at the focus of pyrometer 226. The lamp produces a known temperature at a specific current that can be related to the signal recorded at the two pyrometer wavelengths over the detector range.

According to two-color theory, the ratio of the measured radiance signals R plotted against the inverse ratio temperature 1/TR falls along a line:

$$1/T_R = c_1 \ln R + c_2$$

where $c_1$ and $c_2$ are hardware constants obtained by performing a least-squares fit to lamp data. The value of R is an average of the pixel-by-pixel ratio of the radiance images $I_1$ and $I_2$ over a region Q. For example, without limitation, the two-color pyrometry radiance data for $I_1$ and $I_2$ may be collected at wavelengths $\lambda 1 = 750$ nm and $\lambda 2 = 900$ nm, respectively. This approach reduces errors that can arise from low signal areas outside of laser hotspot.

The region $\Omega_p$ is defined by a contour level c, where $c = \beta \times \max(I)$, wherein the radiance data I is either $I_1$ or $I_2$ depending upon context. The contour is specified by $\beta \in (0, 1)$ and computed using marching squares. Contours may form a single closed path or several closed paths with larger values of $\beta$ tending to shrink the area enclosed by the contour.

Making use of Wien's approximation of Planck's law, radiance data $I_1$ is used to evaluate a constant $A_\lambda$ that lumps together the instrument detector factor and emissivity.

$$A_\lambda = I_1 e^{p2/\lambda_1 T_R},$$

where p is 14388 nm-K and $I_1$ is an average intensity of $I_1$ computed over a localized region $\Omega_p$. Then a hybrid mode temperature estimate $T_H$ is calculated as $$T_H = \frac{p_2}{\lambda_2 \ln(A_\lambda / I_2)},$$

where $I_2$ is radiance data on entire image (i.e. not simply over the region $\Omega p$). This simplification only holds if emissivity does not vary significantly with temperature over the melt pool. Emissivity drops above liquidus temperature but eventually stabilizes. Biasing coefficient $A_\lambda$ for peak temperature with β suggests that hybrid mode temperatures should be higher than true temperatures. Indeed, comparison of melt pool widths from unpublished bead-on-plate welds, as measured by the two-color pyrometer and by cross-sectional SEM, shows an over estimation of around 10%, which confirms an effective emissivity drop (temperature increase) from liquidus to super-heated melt.

Shape identifier 210 is configured to identify shapes 236 that are fit to high temperature areas 234 on the layers of a structure as determined using temperature data 232. Shapes 236 may comprise any appropriate shapes that may be used to indicate high temperature areas 234. For example, without limitation, shapes 236 may be ellipses 238.

In accordance with an illustrative embodiment, closed contours 240 around high temperature areas 234 may be identified from temperature data 232. Closed contours 240 may be identified in the manner described above. However, in this case, closed contours 240 are identified using temperature data 232 rather than radiance values from pyrometry data 220.

Each of closed contours 240 may be defined by a set of points connected by straight line segments. Shapes 236 may comprise best fitting shapes, such as best fitting ellipses 238, that are fit to the points defining closed contours 240 around high temperature areas 234. Shapes 236 thus correspond to the melt pools in the layers of a structure during additive manufacturing of the structure.

Various conditions 242 for each of shapes 236, such as each of ellipses 238, may be identified. Since shapes 236 correspond to melt pools in the layers of a structure during additive manufacturing of the structure, conditions 242 of shapes 236 indicate conditions of the melt pools corresponding to shapes 236.

For example, without limitation, conditions 242 of shapes 236 may include one or more of high temperature 244 within shapes 236, aspect ratio 246 of shapes 236, orientation 248 of shapes 236, and other 250 characteristic of shapes 236. Aspect ratio 246 may be computed as L/W, where L and W are the long and short dimensions, respectively, of shapes 236, such as ellipses 238. The computed aspect ratio 246 is always L/W>=1. Orientation 248 may be taken as the orientation of shapes 236, such as ellipses 238. There is not a leading or trailing edge of ellipse 238 so that orientation 248 can be rotated by 180 degrees with no effect. Orientation 248 may be defined as the angle that the long axis of an ellipse or another of shapes 236 makes with respect to any appropriate axis in the image plane of pyrometry data 220.

Average conditions identifier 212 is configured to identify average conditions 252 for conditions 242 of shapes 236 identified in pyrometry data 220 for the build of a structure. Average conditions 252 provide a useful analysis of the normal, average melt pool behavior during the build. Anomalous melt pool conditions are linked to porosity formation. Therefore, average melt pool conditions must be understood to identify outliers. For example, without limitation, average conditions 252 of shapes 236 may be identifies by determining a distribution of shapes 236 based on aspect ratio 246 and orientation 248 of shapes 236.

Outlier identifier 214 is configured to identify outlier shapes 254 in shapes 236. Outlier shapes 254 are those of shapes 236 having conditions 242 that are different from average conditions 252 by more than a selected amount. For example, without limitation, outlier identifier 214 may be configured to identify outlier shapes 254 as shapes 236 having fewer than a selected number of neighbors within a selected distance in the distribution generated by average conditions identifier 212. This example of a method of identifying outlier shapes 254 is described in more detail below with reference to FIG. 4.

Outlier shapes 254 are indicative of voids in a structure. Void identifier 216 is configured to identify the location of voids in a structure from outlier shapes 254. Process control modifier 218 may use identified outlier shapes 254 to send appropriate modifications to process controller 256 to modify the additive manufacturing process to reduce the number of outlier shapes 254, and thus reduce the occurrence of voids in a structure.

The illustration of porosity identification system 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
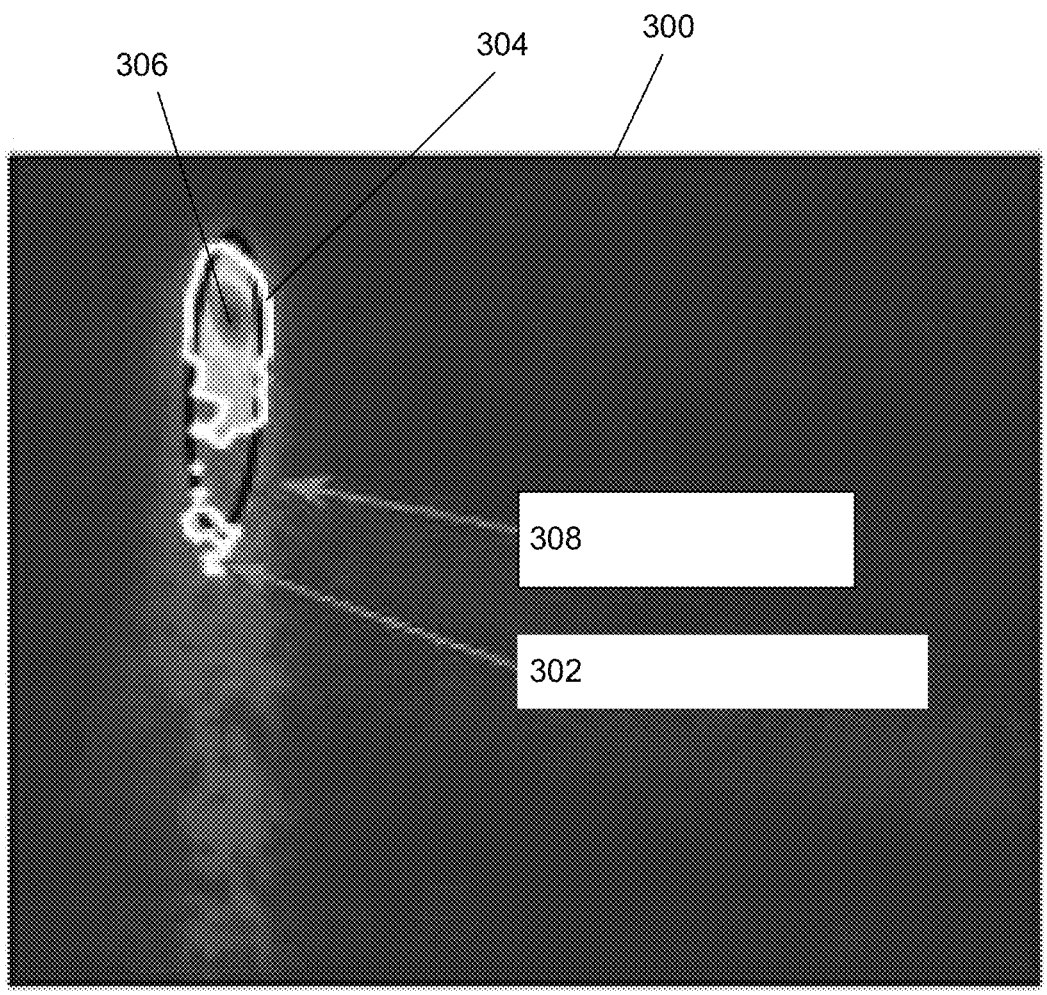
FIG. 3 is an illustration of an example of a processed pyrometry image in accordance with an illustrative embodiment.

Turning to FIG. 3, an illustration of an example of a processed pyrometry image is depicted in accordance with an illustrative embodiment. Image 300 is an example of one of images 224 of a portion of a layer of a structure after processing by shape identifier 210 in FIG. 2.

In this example, closed contours 302 and 304 are identified around high temperature area 306 identified in image 300. Ellipse 308 is fit to high temperature area 308 by fitting ellipse 308 around closed contours 302 and 304.

Figure 4:
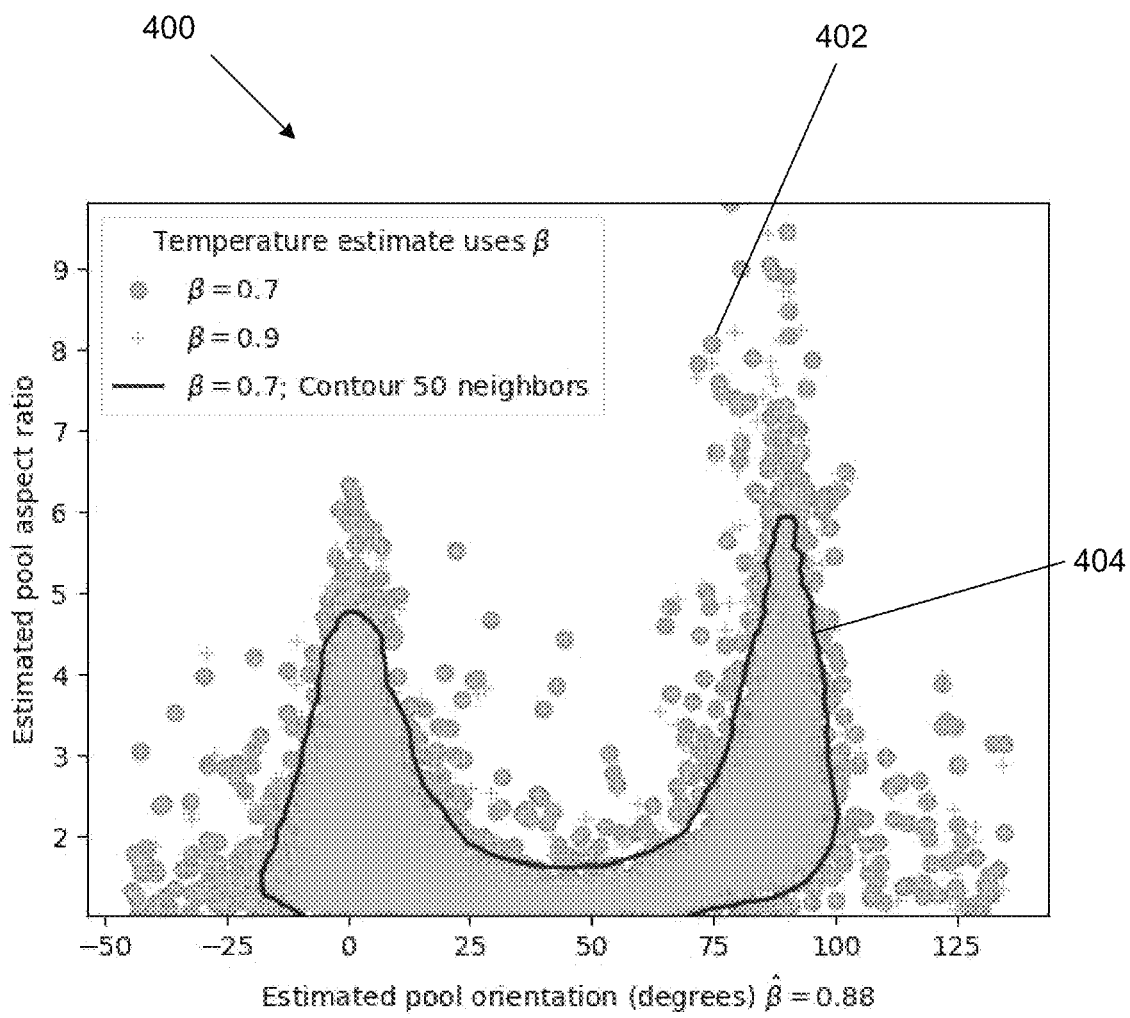
FIG. 4 is an illustration of a plot of a distribution of shapes based on shape aspect ratio versus shape orientation for identifying outlier shapes in accordance with an illustrative embodiment.

Turning to FIG. 4, an illustration of a plot of a distribution of shapes based on shape aspect ratio versus shape orientation for identifying outlier shapes is depicted in accordance with an illustrative embodiment. Each marker 402 in plot 400 denotes an individual pyrometry image of a single melt pool event and is classified as normal or outlier using clustering concepts. Melt pools existing outside the expectation envelope, represented by line 404 in plot 400 are deemed outlier images. The identification of outlier melt pools represents anomalous melt pool behavior and is linked to void formation.

Each marker 402 in plot 400 may be classified as normal or outlier using a neighborhood searching algorithm. First, the data in plot 400 may be scaled in both the vertical and horizontal axes to a range of [−1, 1]. The scaled data may be used to create a k-d tree. A k-d tree is a computational method commonly used to partition data into different groups for classification. The expectation envelope for melt pool character, represented by line 404 in plot 400 may be generated using a uniform background grid of points. At each grid point, the number of neighbors within a circle of radius ρ may be found using the k-d tree. For example, without limitation, the value of ρ=0.075 may be used on scaled data to calculate the number of neighbors at each grid point. A contour plot then may be made on the background grid to mark the expectation envelope. Markers 402 with less than, for example, 50 neighbors, may be classified as outliers and fall outside of contour line 404 in plot 400. Melt pool outliers are conceptually defined as those which exhibit a particular combination of aspect ratio and orientation which significantly differentiates them from other melt pools. Paramount in this determination is size, shape and location of the best fitting ellipse for each outlier image.

Figure 5:
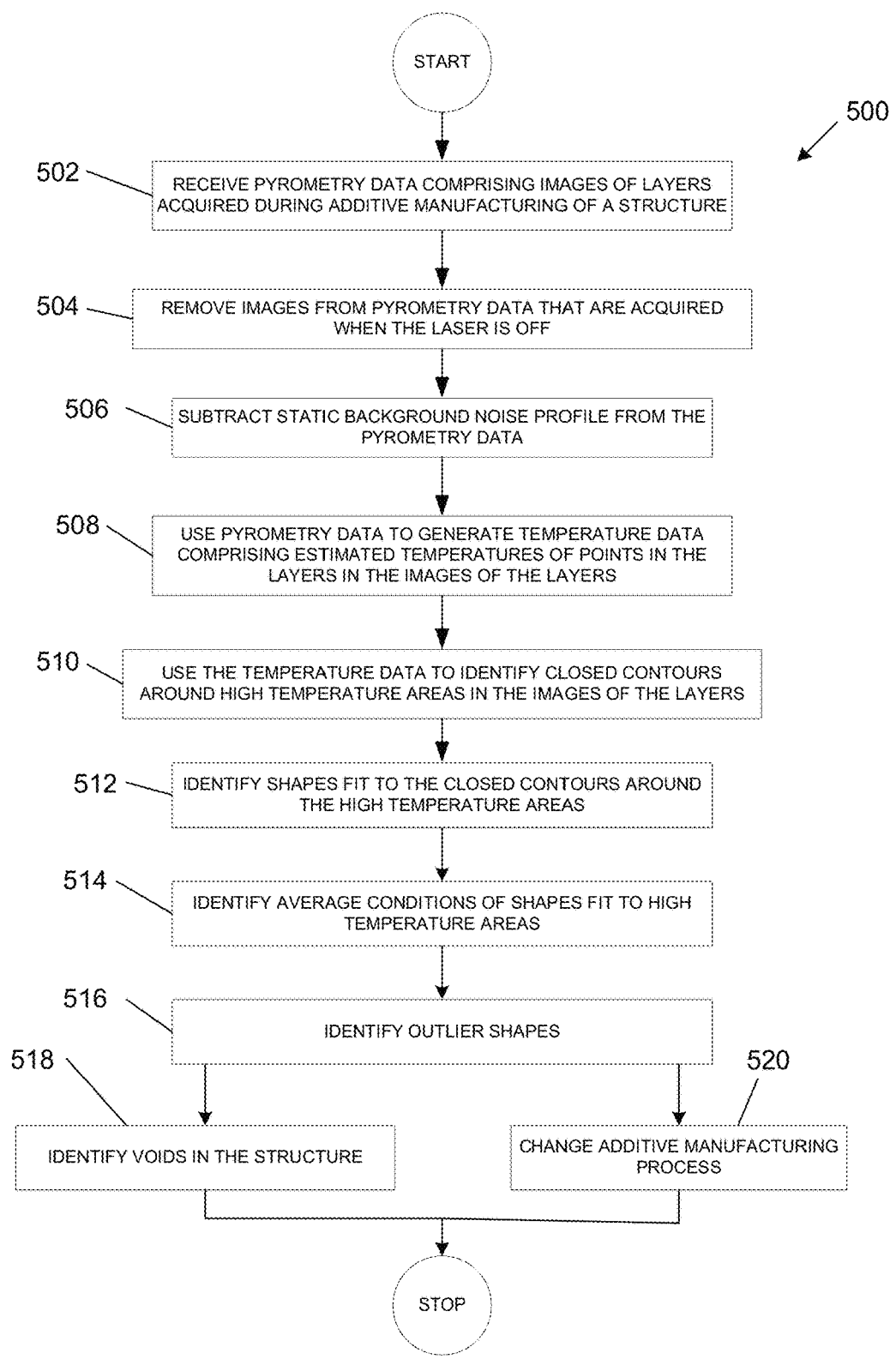
FIG. 5 is an illustration of a flowchart of a process for identifying porosity in a structure made by an additive manufacturing process in accordance with an illustrative embodiment.

Turning to FIG. 5, an illustration of a flowchart of a process for identifying porosity in a structure made by an additive manufacturing process is depicted in accordance with an illustrative embodiment. Process 500 may be implemented, for example, in porosity identification system 122 in FIG. 1 or porosity identification system 200 in FIG. 2.

Process 500 may begin with receiving pyrometry data comprising images of layers acquired during additive manufacturing of a structure (operation 502). Images that are acquired when the laser is off may be removed from the pyrometry data (operation 504). A static background noise profile also may be subtracted from the pyrometry data (operation 506), before further processing is performed.

The pyrometry data then may be used to generate temperature data comprising estimated temperatures of points in the layers from the images of the layers (operation 508). The temperature data may be used to identify closed contours around high temperature areas in the images of the layers (operation 510). Shapes fit to the closed contours around the high temperature areas are identified (operation 512). Average conditions of the shapes fit to the high temperature areas are determined (operation 514). Outlier shapes are identified (operation 516) as shapes having conditions that are different from the average conditions by more than a selected amount. Voids in the structure may be identified from the identified outlier shapes (operation 518), with the process terminating thereafter. Alternatively, or in addition, the additive manufacturing process may be changed in response to identifying the outlier shapes (operation 520), with the process terminating thereafter.

Figure 6:
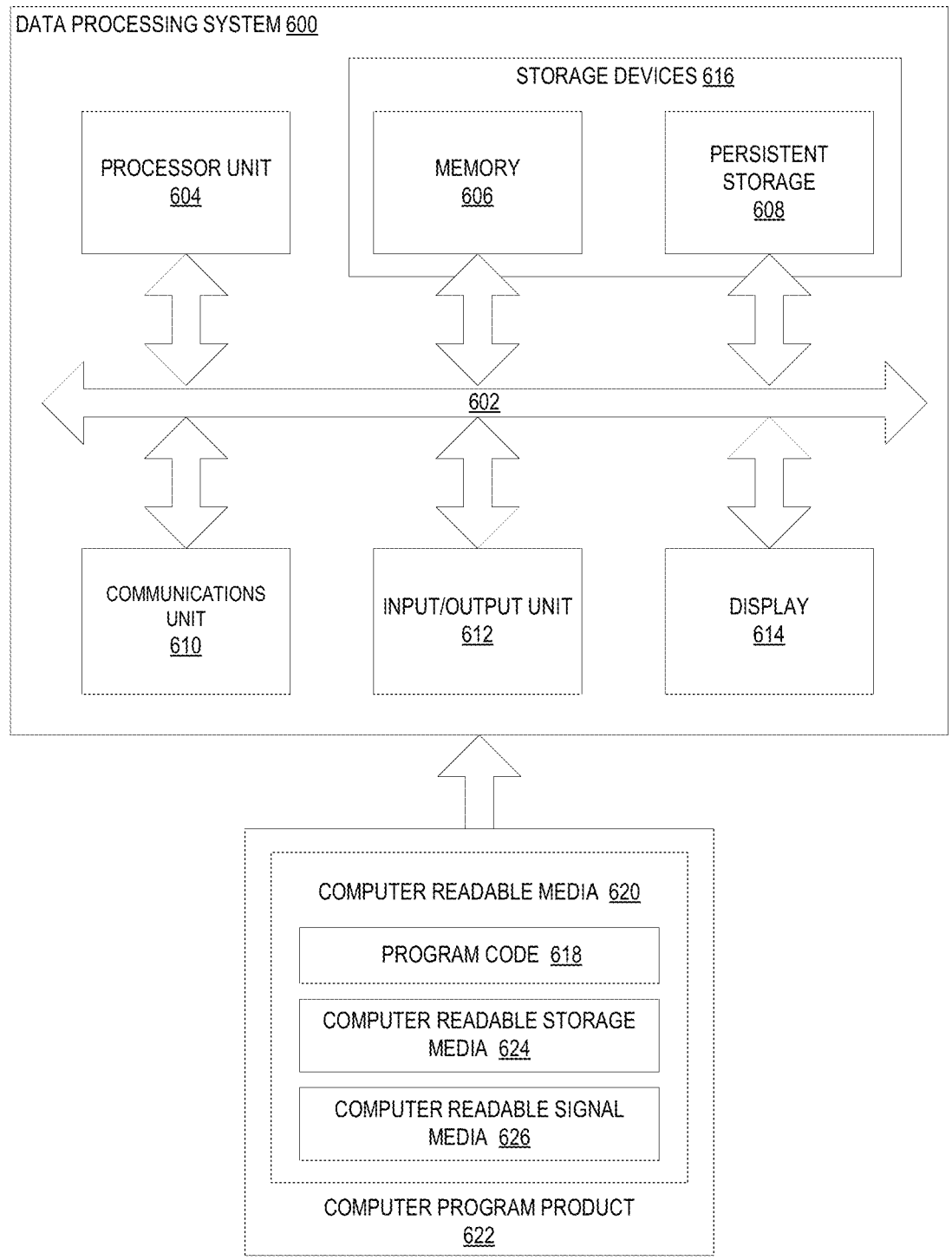
FIG. 6 is an illustration of a block diagram of a data processing system in accordance with an illustrative embodiment.

Turning to FIG. 6, an illustration of a block diagram of a data processing system is depicted in accordance with an illustrative embodiment. Data processing system 600 is an example of one possible implementation of a system in which process controller 110 and porosity identification system 122 in FIG. 1 or porosity identification system 200 in FIG. 2 may be implemented.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of identifying porosity in a structure made by an additive manufacturing process in which a laser is scanned across layers of material to form the structure, comprising:
   receiving pyrometry data comprising images of the layers acquired during additive manufacturing of the structure;
   using the pyrometry data to generate temperature data comprising estimated temperatures of points in the layers in the images of the layers;
   using the temperature data, identifying shapes fit to high temperature areas in the images of the layers;
   identifying conditions of the shapes fit to the high temperature areas in the images of the layers;
   identifying outlier shapes using the conditions of the shapes, wherein identifying the outlier shapes using the conditions of the shapes comprises:
   determining a distribution of the shapes based on an aspect ratio and an orientation of the shapes; and
   identifying the outlier shapes as shapes having fewer than a selected number of neighbors within a selected distance in the distribution.

2. The method of claim 1, wherein the pyrometry data comprises two-color pyrometry data.

3. The method of claim 1 further comprising, before using the pyrometry data to generate the temperature data, removing images from the pyrometry data that are acquired when the laser is off.

4. The method of claim 3, wherein removing images from the pyrometry data that are acquired when the laser is off comprises:
setting a minimum threshold value on the pyrometry data; and
for each image in the images, determining whether a highest value of the pyrometry data for the image is less than the minimum threshold value and removing the image from the pyrometry data in response to a determination that the highest value of the pyrometry data for the image is less than the minimum threshold value.

5. The method of claim 1 further comprising, before using the pyrometry data to generate the temperature data, subtracting a static background noise profile from the pyrometry data.

6. The method of claim 1, wherein identifying the shapes fit to the high temperature areas in the images of the layers comprises:
using the temperature data, identifying closed contours around the high temperature areas in the images of the layers; and
identifying the shapes fit to the closed contours around the high temperature areas in the images of the layers.

7. The method of claim 1, wherein the shapes fit to the high temperature areas in the images of the layers comprise ellipses.

8. The method of claim 1 further comprising using the identified outlier shapes to identify voids in the structure.

9. The method of claim 1 further comprising using the identified outlier shapes to change the additive manufacturing process.

10. A method of identifying porosity in a structure made by an additive manufacturing process in which a laser is scanned across layers of material to form the structure, comprising:
receiving pyrometry data comprising images of the layers acquired during additive manufacturing of the structure;
using the pyrometry data to generate temperature data comprising estimated temperatures of points in the layers in the images of the layers;
using the temperature data, identifying ellipses fit to high temperature areas in the images of the layers;
identifying outlier ellipses in the ellipses fit to the high temperature areas in the images of the layers using conditions of the ellipses, wherein identifying the outlier ellipses using the conditions of the ellipses comprises:
determining a distribution of the ellipses based on an aspect ratio and an orientation of the ellipses; and
identifying the outlier ellipses as shapes having fewer than a selected number of neighbors within a selected distance in the distribution; and
using the identified outlier ellipses to identify voids in the structure.

11. A system for identifying porosity in a structure made by an additive manufacturing process in which a laser is scanned across layers of material to form the structure, comprising:
a receiver configured to receiving pyrometry data comprising images of the layers acquired during additive manufacturing of the structure;
a temperature estimator configured to use the pyrometry data to generate temperature data comprising estimated temperatures of points in the layers in the images of the layers;
a shape identifier configured to use the temperature data to identify shapes fit to high temperature areas in the images of the layers;
an outlier identifier configured to identify outlier shapes in the shapes fit to the high temperature areas using conditions of the shapes;
an average conditions identifier configured to determine a distribution of the shapes based on an aspect ratio and an orientation of the shapes; and
wherein the outlier identifier is configured to identify the outlier shapes as shapes having fewer than a selected number of neighbors within a selected distance in the distribution.

12. The system of claim 11, wherein the pyrometry data comprises two-color pyrometry data received from a two-color pyrometer.

13. The system of claim 11 further comprising an image filter configured to remove images from the pyrometry data that are acquired when the laser is off before using the pyrometry data to generate the temperature data.

14. The system of claim 11 further comprising a noise subtractor configured to subtract a static background noise profile from the pyrometry data before using the pyrometry data to generate the temperature data.

15. The system of claim 11, wherein the shape identifier is configured to:
use the temperature data to identify closed contours around the high temperature areas in the images of the layers; and
identify the shapes fit to the closed contours around the high temperature areas in the images of the layers.

16. The system of claim 11, wherein the shapes fit to the high temperature areas in the images of the layers comprise ellipses.

17. The system of claim 11 further comprising a void identifier configured to use the identified outlier shapes to identify voids in the structure.

18. The system of claim 11 further comprising a process controller interface configured to use the identified outlier shapes to change the additive manufacturing process.

* * * * *